(12) United States Patent  
Yang et al.

(10) Patent No.: US 11,769,416 B2  
(45) Date of Patent: Sep. 26, 2023

(54) METHOD FOR COLLABORATIVE AND OPTIMAL ALLOCATION OF ROUTE TIME SLOT AND FLIGHT LEVEL

(71) Applicant: THE 28TH RESEARCH INSTITUTE OF CHINA ELECTRONICS TECHNOLOGY GROUP CORPORATION, Nanjing (CN)

(72) Inventors: Shangwen Yang, Nanjing (CN); Qiucheng Xu, Nanjing (CN); Jibo Huang, Nanjing (CN); Yang Ding, Nanjing (CN); Shenghao Fu, Nanjing (CN)

(73) Assignee: THE 28TH RESEARCH INSTITUTE OF CHINA ELECTRONICS TECHNOLOGY GROUP CORPORATION, Nanjing (CN)

( * ) Notice: Subject to any disclaimer, the term of this patent is extended or adjusted under 35 U.S.C. 154(b) by 0 days.

(21) Appl. No.: 17/816,962

(22) Filed: Aug. 2, 2022

(65) Prior Publication Data

US 2022/0375353 A1  Nov. 24, 2022

Related U.S. Application Data

(63) Continuation of application No. PCT/CN2022/079501, filed on Mar. 7, 2022.

(30) Foreign Application Priority Data

Apr. 7, 2021 (CN) .......................... 202110371533.0

(51) Int. Cl.  
*G08G 5/00* (2006.01)

(52) U.S. Cl.  
CPC ................................. *G08G 5/0039* (2013.01)

(58) Field of Classification Search  
CPC ..................................................... G08G 5/0039  
(Continued)

(56) References Cited

U.S. PATENT DOCUMENTS

| 8,290,696 B1* | 10/2012 | Sridhar | G08G 5/045 701/1 |
| 8,886,446 B1* | 11/2014 | Baiada | G06Q 50/30 701/122 |
| 2019/0147750 A1* | 5/2019 | Joyson | G08G 5/0043 701/122 |

FOREIGN PATENT DOCUMENTS

| CN | 105469647 A | 4/2016 |
| CN | 109598985 A | 4/2019 |
| CN | 110428665 A | 11/2019 |

OTHER PUBLICATIONS

Xinglong Wang etc. "Influential Node Evaluation of Air Traffic System Based on Complex Network" Command Intormation System and Technology vol. 9, No. 3 p. 18-22 Jun. 30, 2018.

(Continued)

*Primary Examiner* — Peter D Nolan  
*Assistant Examiner* — Luke Huynh  
(74) *Attorney, Agent, or Firm* — CBM PATENT CONSULTING, LLC (57) ABSTRACT

A method for collaborative and optimal allocation of a route time slot and a flight level comprises: acquiring planned route information and alternative route information in a traffic limited airspace, available time slot information of a downstream airspace unit of the planned route, and flight operation information first, then formulating an algorithm for the collaborative and optimal allocation of the route time slot and the flight level, establishing an objective function and a constraint condition which meet effectiveness by taking a minimum total ground delay loss of all flights, a minimum change number of flight levels of all flights and a (Continued)

minimum total fuel consumption of all flights as objectives, further establishing a multi-objective optimization model for the collaborative allocation of the route time slot and the flight level, and forming a strategy for the collaborative and optimal allocation of the route time slot and the flight level.

5 Claims, 3 Drawing Sheets

(58) Field of Classification Search
USPC .......................................................... 701/122
See application file for complete search history.

(56) References Cited

OTHER PUBLICATIONS

Xinglong Wang etc., "Route Allocation Model and Algorithm Based on Slot and Flight Level Colla boration" Journal of Guangxi Normal University (Natural Science Edition) No. 4 p. 68-72 Dec. 15, 2011.
Yifei Zhao, "Time route Assignment Model and Algorithm for Short-term Area Traffic Flow Management" Acta Aeronautica et Astronautica Sinica No. 1 p. 1231-126 Jan. 15, 2009.
Shangwen Yang etc. "Stochastic collaborative slot allocation models" Systems Engineering—Theory & Practice No. 1 p. 153-157 Jan. 15, 2014.

* cited by examiner

METHOD FOR COLLABORATIVE AND OPTIMAL ALLOCATION OF ROUTE TIME SLOT AND FLIGHT LEVEL

CROSS REFERENCES

This application is the U.S. Continuation Application of International Application No. PCT/CN2022/079501 filed on 7 Mar. 2022 which designated the U.S. and claims priority to Chinese Application No. CN202110371533.0 filed on 7 Apr. 2021, the entire contents of each of which are hereby incorporated by reference.

TECHNICAL FIELD

The present invention belongs to the field of air traffic management, and more particularly, relates to a method for implementing route flow management based on a four-dimensional trajectory, which may be applied to airspace management.

BACKGROUND

It is one of the key stages of "Optimum capacity and flexible flights" in the Performance Improvement Area 3 of "Aviation System Block Upgrades" of International Civil Aviation Organization to improve the operation by free routing, with a core idea that a planned route is allowed to be changed to make full use of an airspace resource, meet a requirement of optimal flight trajectory and improve an efficiency of route flow management. Allocation of a route time slot resource is a key technology of the route flow management. Generally, aiming at a limited capacity of the planned route and a condition of an available route, the route time slot resource is collaboratively allocated and a flight schedule is optimally arranged according to a flight delay cost and a route capacity. MITRE Corporation in America has developed a collaborative allocation tool for a route resource, which provides multiple optional routes for a flight user, and allocates an optimal route by taking a highest preference as an objective according to the available route, the preference of the flight user and other information, thus effectively reducing an influence of route congestion caused by weather and other factors. An airspace flow management program is a route resource management strategy adopted by US Federal Aviation Administration, in which the route time slot is optimally allocated based on a collaborative decision-making objective of all parties concerned according to a time slot resource and a flight requirement of the available route in a traffic limited area. EUROCONTROL has put forward a concept of air traffic flow and capacity management, in which an airspace capacity is collaboratively allocated and a flight flow is deployed by combining ground delay and rerouting. Domestic research results are mainly based on theoretical researches. Some scholars comprehensively used various management methods such as ground delay, a dynamic route and a conditional route, introduced costs of opening the dynamic route and the conditional route, and established a mathematical model by taking a minimum operating cost as an objective. Some scholars considered a coupling capacity of routes, established a 0-1 integer programming model for collaborative allocation of multi-route resources that integrated a rerouting strategy and a delay strategy, made full use of available route resources, and reduced a total flight delay cost. Some scholars established a multi-objective optimization model for collaborative allocation of the route time slot resource by taking a minimum total number of turning points of all flights, a minimum total number of turning points of all flights and a minimum average delay time of passengers as objectives.

During realization of the present invention, the inventor found that there are at least the following problems in the prior art.

Allocation of a flight level is rarely considered in existing researches. However, the flight level has a great influence on fuel consumptions of different types of flights, and is also an important index of an optimal flight trajectory. By collaboratively allocating the route and the flight level thereof with the time slot, a flexible flight efficiency under the route flow management is shown in different forms, requirements of an air traffic controller, an airline and other related parties are taken into account, multiple optimization objectives are established, and multiple allocation strategies are provided for a decision maker to select. At present, there is still a lack of a method for collaborative and optimal allocation of a route time slot and a flight level.

SUMMARY

Object of the invention: the technical problem to be solved by the present invention is that: according to concepts of free route selection and flexible flight, a multi-objective optimization model for collaborative allocation of a route time slot and a flight level is established, and a route, a flight level and a time slot resource are reasonably allocated for each flight according to an available route, and a flight level configuration, a capacity and a flow condition thereof, and an allocation strategy set is generated, so as to maximize a route traffic operation efficiency and optimize a flight trajectory.

In order to solve the technical problem above, the present invention discloses a method for collaborative and optimal allocation of a route time slot and a flight level, which comprises the following steps of:

step 1: acquiring planned route information and alternative route information in a traffic limited airspace, acquiring available time slot information of a downstream airspace unit of the planned route and acquiring flight operation information through an information platform for collaborative management of airspace and flow;

step 2: formulating an algorithm for the collaborative and optimal allocation of the route time slot and the flight level by using the information platform for collaborative management of airspace and flow;

step 3: establishing a multi-objective optimization model for the collaborative allocation of the route time slot and the flight level according to the algorithm for the collaborative and optimal allocation of the route time slot and the flight level;

step 4: solving the multi-objective optimization model established in the step 3 to obtain a non-inferior solution set, and forming a strategy set for the collaborative and optimal allocation of the route time slot and the flight level; and step 5: issuing the strategy for the collaborative and optimal allocation of the route time slot and the flight level to carry out multi-objective optimal allocation through the information platform for collaborative management of airspace and flow established in the step 1; reallocating flights in a period of time.

Preferably, both the planned route information and the alternative route information in the step 1 comprise a route capacity, a route flight level configuration and a route length, the route flight level configuration comprises a number of flight levels configured in each route and a capacity of each flight level; and the flight operation information comprises a flight plan, a ground delay cost, an aircraft type, fuel consumptions of different flight levels and a number of passengers.

Preferably, the step 2 comprises:
step 2.1: establishing an objective function by taking a minimum total ground delay loss of all flights as an objective;
step 2.2: establishing an objective function by taking a minimum change number of flight levels of all flights as an objective;
step 2.3: establishing an objective function by taking a minimum total fuel consumption of all flights as an objective; and
step 2.4: establishing a constraint condition meeting effectiveness.

In the algorithm for the collaborative and optimal allocation of the route time slot and the flight level, considering a difference in fuel consumptions of different types of flights at different flight levels, a flight level with less fuel consumption is allocated to each flight, and a control load caused by change of the flight level is reduced at the same time, which reflects an influence of the flight level on route flow management, and by rationally configuring the route, the flight level and the time slot, an optimal flight trajectory is realized, and preferences of an air traffic controller, an airline and other related parties are taken into account.

Preferably, in the step 2.1 of taking the minimum total ground delay loss of all flights as the objective, the ground delay loss of a single flight comprises a cost of ground delay executed by the flight and a delay loss of passengers carried by the flight, and the established objective function is:

$$\min \sum_{i=1}^{I}\sum_{j=1}^{J}\sum_{k=1}^{K}\sum_{u_k=1}^{U_k} (c_i^g + c_i^p n_i)(t_j - eta_i) x_{ij}^{ku},$$

wherein $c_i^g$ denotes a unit time cost of the ground delay executed by the flight i, $1 \leq i \leq I$, I is a total number of flights, $c_i^p$ denotes a unit time delay loss of passengers carried by the flight i, $n_i$ is a number of passengers carried by the flight i, $t_j$ is a start time of a time slot j, $1 \leq j \leq J$, J is a total number of time slots, $eta_i$ denotes a planned arrival time of the flight i to a downstream airspace unit, $1 \leq k \leq K$, K is a number of optional routes (comprising the planned route and the alternative route), $u_k$ denotes a $u_k^{th}$ flight level of a route k, $1 \leq u_k \leq U_k$, $U_k$ is a number of flight levels of the route k, and $x_{ij}^{ku}$ is a decision variable, which is expressed as:

$$x_{ij}^{ku} = \begin{cases} 1, & \text{the flight } i \text{ is allocated to the time slot } j \text{ and the } u_k^{th} \text{ flight level of the route } k \text{ is selected} \\ 0, & \text{otherwise} \end{cases}$$

Preferably, in the step 2.2 of taking the minimum change number of flight levels of all flights as the objective, the established objective function is:

$$\min \sum_{i=1}^{I}\sum_{j=1}^{J}\sum_{k=1}^{K}\sum_{u_k=1}^{U_k} h_i^{ku} x_{ij}^{ku},$$

wherein $h_i^{ku}$ is an indicator variable for flight level change of the flight i, which is expressed as:

$$h_i^{ku} = \begin{cases} 1, & H_i^e \neq u_k \\ 0, & \text{otherwise} \end{cases},$$

wherein $H_i^e$ denotes a flight level planned to be used by the flight i.

Preferably, in the step 2.3 of taking the minimum total fuel consumption of all flights as the objective, the established objective function is:

$$\min \sum_{i=1}^{I}\sum_{j=1}^{J}\sum_{k=1}^{K}\sum_{u_k=1}^{U_k} \frac{D_k}{v_i} f_i^{ku} x_{ij}^{ku},$$

wherein $f_i^{ku}$ denotes a fuel consumption per unit time of the flight i at the $u_k^{th}$ flight level, $D_k$ denotes a length of the route k, and $v_i$ denotes an average ground velocity of the flight i.

Preferably, the following constraint conditions meeting effectiveness are established in the step 2.4:

$$\sum_{j=1}^{J}\sum_{k=1}^{K}\sum_{u_k=1}^{U_k} x_{ij}^{ku} = 1,$$

which denotes that each flight has only one time slot, one route and one flight level that the flight belongs to;

$$\sum_{i=1}^{I}\sum_{k=1}^{K}\sum_{u_k=1}^{U_k} x_{ij}^{ku} \leq 1,$$

which denotes that each time slot is only capable of being allocated to one flight at most;
$t_j \geq eta_i$, which denotes that an actual arrival time of the flight is incapable of being earlier than a planned arrival time;

$$t_j \geq eta_i - T_i + \frac{D_k}{v_i} x_{ij}^{ku},$$

which denotes that when the flight selects the route k, the actual arrival time is incapable of being earlier than a time after the planned arrival time is affected by a flight time of the flight in the route, wherein $T_i$ is a planned flight time of the flight i;
$x_{ij}^{ku}=0, u_k > H_i^{max}$, which denotes that the flight is incapable of exceeding a ceiling height allowed by a flight performance of the flight, wherein $H_i^{max}$ denotes a maximum flight level of the flight i;

$$\sum_{i=1}^{I}\sum_{j=1}^{J} x_{ij}^{ku} \leq Ca_k^u,$$

which denotes that a flow of each flight level of the route does not exceed a capacity of each flight level, wherein $Ca_k^u$ denotes a capacity of the $u_k^{th}$ flight level of the route k; and $$\sum_{i=1}^{I}\sum_{j=1}^{J}\sum_{u_k=1}^{U_k} x_{ij}^{ku} \le Ca_k,$$

which denotes that a flow sum of the flight levels of the route does not exceed a capacity of the route, wherein $Ca_k$ denotes a capacity of the route k.

Preferably, the multi-objective optimization model for the collaborative allocation of the route time slot and the flight level established in the step 3 is:

$$\min\left\{\sum_{i=1}^{I}\sum_{j=1}^{J}\sum_{k=1}^{K}\sum_{u_k=1}^{U_k}(c_1^g+c_i^p n_i)(t_j-eta_i)x_{ij}^{ku}, \sum_{i=1}^{I}\sum_{j=1}^{J}\sum_{k=1}^{K}\sum_{u_k=1}^{U_k}h_i^{ku}x_{ij}^{ku}, \sum_{i=1}^{I}\sum_{j=1}^{J}\sum_{k=1}^{K}\sum_{u_k=1}^{U_k}\frac{D_k}{v_i}f_i^{ku}x_{ij}^{ku}\right\}$$

$$\text{s.t.}\begin{cases}\sum_{j=1}^{J}\sum_{k=1}^{K}\sum_{u_k=1}^{U_k} x_{ij}^{ku}=1\\ \sum_{i=1}^{I}\sum_{k=1}^{K}\sum_{u_k=1}^{U_k} x_{ij}^{ku}\le 1\\ t_j \ge eta_i\\ t_j \ge eta_i - T_i + \frac{D_k}{v_i}x_{ij}^{ku}\\ x_{ij}^{ku}=0, u_k > H_i^{max}\\ \sum_{i=1}^{I}\sum_{j=1}^{J} x_{ij}^{ku} \le Ca_k^u\\ \sum_{i=1}^{I}\sum_{j=1}^{J}\sum_{u_k=1}^{U_k} x_{ij}^{ku} \le Ca_k\\ x_{ij}^{ku}\begin{cases}1, \text{ the flight } i \text{ is allocated to the time slot } j \text{ and the } u_k^{th} \text{ flight level of the route } k \text{ is selected}\\ 0, \text{ otherwise}\end{cases}\\ h_i^{ku}=\begin{cases}1, H_i^e \ne u_k\\ 0, \text{ otherwise}\end{cases}\\ 1\le i \le I, 1 \le j \le J, 1 \le k \le K, 1 \le u_k \le U_k\end{cases}$$

The route flow management and the collaborative management of airspace and flow are carried out according to a result of the step 5.

The method for the collaborative and optimal allocation of the route time slot and the flight level of the present invention is loaded and operated in a processing server of an air traffic flow management system (ATFM system) or a corresponding computer of an air traffic control system (ATC system).

Beneficial Effects:
1. An implementation method for the collaborative and optimal allocation of the route time slot and the flight level is provided;
2. a technical support is provided for route flow management based on a four-dimensional trajectory; and
3. a technical basis is provided for the route flow management and the collaborative management of airspace and flow.

BRIEF DESCRIPTION OF THE DRAWINGS

The advantages of the above and/or other aspects of the present invention will become more apparent by further explaining the present invention with reference to the following drawings and detailed description.

DETAILED DESCRIPTION

The present invention will be described in detail hereinafter with reference to the drawings and the embodiments.

Figure 1:
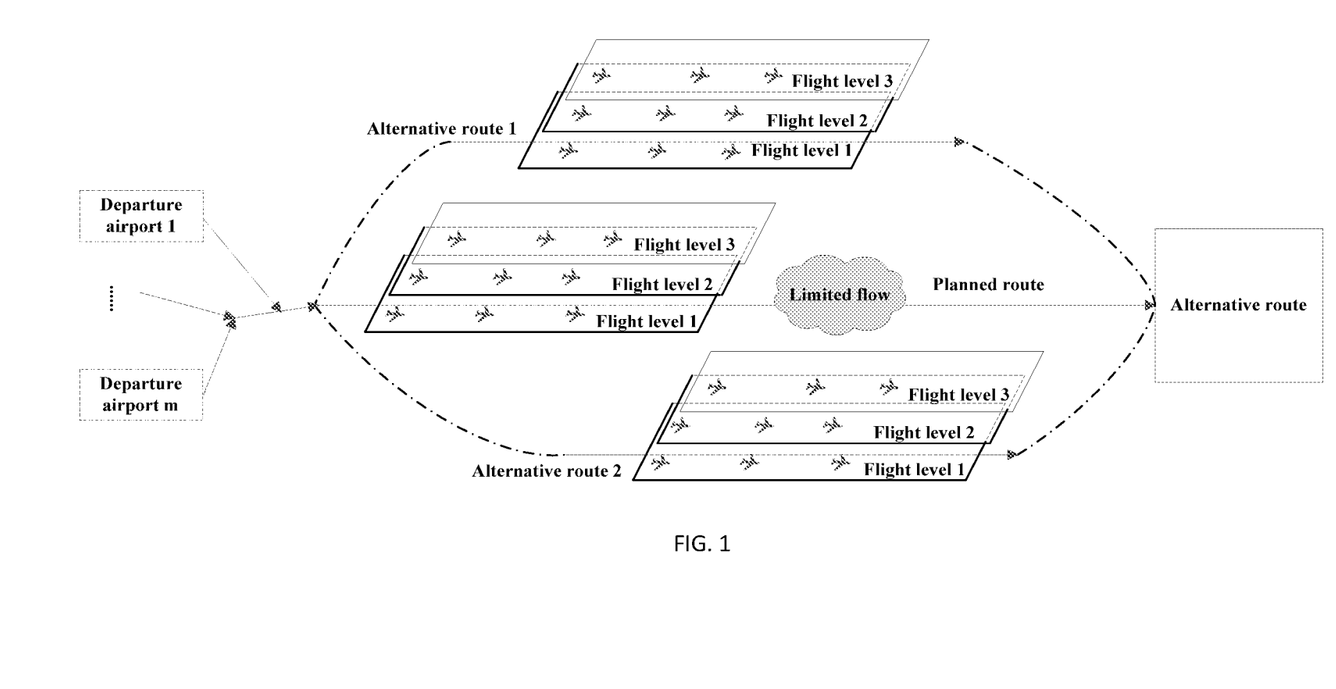
FIG. 1 is a schematic diagram of route selection and flight level configuration.

As shown in FIG. 1, there are multiple available routes comprising a planned route and an alternative route from each departure airport to a downstream airspace unit of the planned route. Each route is provided with several flight levels, fuel consumptions per unit time of the same type of aircraft at different flight levels are not exactly the same, fuel consumptions per unit time of different types of aircrafts at the same flight level are also different, and different types of aircrafts have different ceiling heights. When the planned route is influenced by dangerous weather and other factors, a capacity may be reduced, it is necessary to arrange ground delay scientifically according to a flight performance, a capacity of the downstream airspace unit, the available route and a flight level configuration thereof, and other conditions, and optimal flight route and flight level are allocated to each flight, thus optimizing a route traffic order. A change of the flight level can increase a control load, and the change of the flight level should be minimized while optimizing allocation of a flight time slot and the flight level, thus controlling the increase of the control load.

Figure 2:
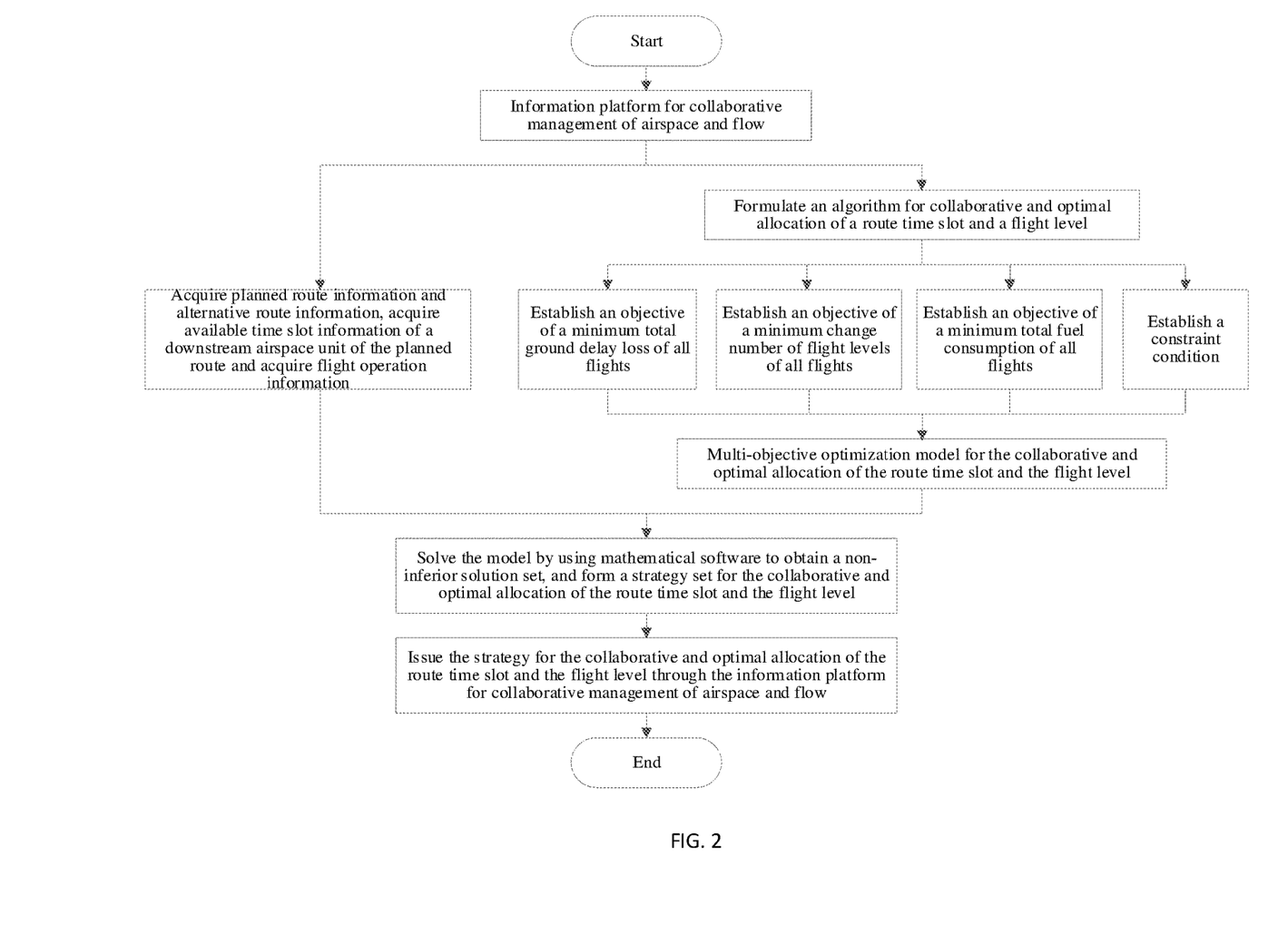
FIG. 2 is a flow chart of a method of the present invention.

As shown in FIG. 2, the present invention discloses a method for collaborative and optimal allocation of a route time slot and a flight level, which comprises the following steps.

In step 1, planned route information and alternative route information in a traffic limited airspace comprising a route capacity, a route flight level configuration and a route length are acquired, available time slot information of a downstream airspace unit of the planned route is acquired, and flight operation information comprising a flight plan, a ground delay cost, an aircraft type, fuel consumptions of different flight levels and a number of passengers is acquired through an information platform for collaborative management of airspace and flow. The information platform for collaborative management of airspace and flow is a collaborative work platform of an airport, an airline and an air traffic controller, and is a well-known platform in the art. The route flight level configuration comprises a number of flight levels configured for each route and a capacity of each flight level.

In step 2, an algorithm for the collaborative and optimal allocation of the route time slot and the flight level is formulated by using the information platform for collaborative management of airspace and flow.

In step 3, a multi-objective optimization model for the collaborative allocation of the route time slot and the flight level is established according to the algorithm for the collaborative and optimal allocation of the route time slot and the flight level.

In step 4, the multi-objective optimization model established in the step 3 is solved by using Lingo, Matlab and other mathematical software to obtain a non-inferior solution set, and a strategy set for the collaborative and optimal allocation of the route time slot and the flight level is formed.

In step 5: the strategy for the collaborative and optimal allocation of the route time slot and the flight level is issued to carry out multi-objective optimal allocation through the information platform for collaborative management of airspace and flow established in the step 1. As for the strategy for the collaborative and optimal allocation of the route time slot and the flight level, an allocation strategy is selected from the strategy set for the collaborative and optimal allocation of the route time slot and the flight level in the step 4 according to a preference of the air traffic controller.

The route flow management and the collaborative management of airspace and flow are carried out according to a result of the step 5.

In the embodiment, the step 2 comprises:
step 2.1: establishing an objective function by taking a minimum total ground delay loss of all flights as an objective;
step 2.2: establishing an objective function by taking a minimum change number of flight levels of all flights as an objective;
step 2.3: establishing an objective function by taking a minimum total fuel consumption of all flights as an objective; and
step 2.4: establishing a constraint condition meeting effectiveness.

In the embodiment, in the step 2.1 of taking the minimum total ground delay loss of all flights as the objective, the ground delay loss of a single flight comprises a cost of ground delay executed by the flight and a delay loss of passengers carried by the flight, and the established objective function is:

$$\min \sum_{i=1}^{I} \sum_{j=1}^{J} \sum_{k=1}^{K} \sum_{u_k=1}^{U_k} (c_i^g + c_i^p n_i)(t_j - eta_i) x_{ij}^{ku},$$

wherein $c_i^g$ denotes a unit time cost of the ground delay executed by the flight i (the superscript g refers to the "ground", which denotes the ground delay.), $1 \leq i \leq I$, I is a total number of flights, $c_i^p$ denotes a unit time delay loss of passengers carried by the flight i (the superscript p refers to the "passenger"), $n_i$ is a number of passengers carried by the flight i, $t_j$ is a start time of a time slot j, $1 \leq j \leq J$, J is a total number of time slots, $eta_i$ denotes a planned arrival time of the flight i to a downstream airspace unit, $1 \leq k \leq K$, K is a number of optional routes (comprising the planned route and the alternative route), $u_k$ denotes a $u_k^{th}$ flight level of a route k, $1 \leq u_k \leq U_k$, $U_k$ is a number of flight levels of the route k, and $x_{ij}^{ku}$ is a decision variable, which is expressed as:

$$x_{ij}^{ku} = \begin{cases} 1, \text{the flight } i \text{ is allocated to the time} \\ \quad \text{slot } j \text{ and the } u_k^{th} \text{ flight level of the route } k \text{ is selected} \\ 0, \text{otherwise} \end{cases}$$

In the embodiment, in the step 2.2 of taking the minimum change number of flight levels of all flights as the objective, the established objective function is:

$$\min \sum_{i=1}^{I} \sum_{j=1}^{J} \sum_{k=1}^{K} \sum_{u_k=1}^{U_k} h_i^{ku} x_{ij}^{ku},$$

wherein $h_i^{ku}$ is an indicator variable for flight level change of the flight i, which is expressed as:

$$h_i^{ku} = \begin{cases} 1, H_i^e \neq u_k \\ 0, \text{otherwise} \end{cases},$$

wherein $H_i^e$ denotes a flight level planned to be used by the flight i.

In the embodiment, in the step 2.3 of taking the minimum total fuel consumption of all flights as the objective, the established objective function is:

$$\min \sum_{i=1}^{I} \sum_{j=1}^{J} \sum_{k=1}^{K} \sum_{u_k=1}^{U_k} \frac{D_k}{v_i} f_i^{ku} x_{ij}^{ku},$$

wherein $f_i^{ku}$ denotes a fuel consumption per unit time of the flight i at the $u_k^{th}$ flight level, $D_k$ denotes a length of the route k, and $v_i$ denotes an average ground velocity of the flight i.

In the embodiment, the following constraint conditions meeting effectiveness are established in the step 2.4:

$$\sum_{j=1}^{J} \sum_{k=1}^{K} \sum_{u_k=1}^{U_k} x_{ij}^{ku} = 1,$$

which denotes that each flight has only one time slot, one route and one flight level that the flight belongs to;

$$\sum_{i=1}^{I}\sum_{k=1}^{K}\sum_{u_k=1}^{U_k} x_{ij}^{ku} \leq 1,$$

which denotes that each time slot is only capable of being allocated to one flight at most;

$$\sum_{i=1}^{I}\sum_{j=1}^{J}\sum_{u_k=1}^{U_k} x_{ij}^{ku} \leq Ca_k,$$

which denotes that a flow sum of the flight levels of the route does not exceed a capacity of the route, wherein $Ca_k$ denotes a capacity of the route k.

In the embodiment, the multi-objective optimization model for the collaborative allocation of the route time slot and the flight level established in the step 3 is:

$$\min\left\{\sum_{i=1}^{I}\sum_{j=1}^{J}\sum_{k=1}^{K}\sum_{u_k=1}^{U_k}(c_1^g + c_i^p n_i)(t_j - eta_i)x_{ij}^{ku}, \sum_{i=1}^{I}\sum_{j=1}^{J}\sum_{k=1}^{K}\sum_{u_k=1}^{U_k}h_i^{ku}x_{ij}^{ku}, \sum_{i=1}^{I}\sum_{j=1}^{J}\sum_{k=1}^{K}\sum_{u_k=1}^{U_k}\frac{D_k}{v_i}f_i^{ku}x_{ij}^{ku}\right\}$$

$$\text{s.t.}\begin{cases} \sum_{j=1}^{J}\sum_{k=1}^{K}\sum_{u_k=1}^{U_k} x_{ij}^{ku} = 1 \\ \sum_{i=1}^{I}\sum_{k=1}^{K}\sum_{u_k=1}^{U_k} x_{ij}^{ku} \leq 1 \\ t_j \geq eta_i \\ t_j \geq eta_i - T_i + \frac{D_k}{v_i}x_{ij}^{ku} \\ x_{ij}^{ku} = 0, u_k > H_i^{max} \\ \sum_{i=1}^{I}\sum_{j=1}^{J} x_{ij}^{ku} \leq Ca_k^u \\ \sum_{i=1}^{I}\sum_{j=1}^{J}\sum_{u_k=1}^{U_k} x_{ij}^{ku} \leq Ca_k \\ x_{ij}^{ku}\begin{cases} 1, \text{ the flight } i \text{ is allocated to the time slot } j \text{ and the } u_k^{th}\text{ flight level of the route } k \text{ is selected} \\ 0, \text{ otherwise} \end{cases} \\ h_i^{ku} = \begin{cases} 1, H_i^e \neq u_k \\ 0, \text{ otherwise} \end{cases} \\ 1 \leq i \leq I, 1 \leq j \leq J, 1 \leq k \leq K, 1 \leq u_k \leq U_k \end{cases}$$

$t_j \geq eta_i$, which denotes that an actual arrival time of the flight is incapable of being earlier than a planned arrival time;

$$t_j \geq eta_i - T_i + \frac{D_k}{v_i}x_{ij}^{ku},$$

which denotes that when the flight selects the route k, the actual arrival time is incapable of being earlier than a time after the planned arrival time is affected by a flight time of the flight in the route, wherein $T_i$ is a planned flight time of the flight i;

$x_{ij}^{ku}=0, u_k>H_i^{max}$, which denotes that the flight is incapable of exceeding a ceiling height allowed by a flight performance of the flight, wherein $H_i^{max}$ denotes a maximum flight level of the flight i;

$$\sum_{i=1}^{I}\sum_{j=1}^{J} x_{ij}^{ku} \leq Ca_k^u,$$

which denotes that a flow of each flight level of the route does not exceed a capacity of each flight level, wherein $Ca_k^u$ denotes a capacity of the $u_k^{th}$ flight level of the route k; and The present invention is further described hereinafter by taking simulation operation data of civil aviation as an example. Assuming that a certain airspace is influenced by dangerous weather from 14:00 to 15:00 on a certain day and a capacity is greatly reduced, route information of this airspace adjusted according to the influence by the dangerous weather is shown in Table 1, a second flight level FL2 and a third flight level FL3 of the originally planned route are disabled, and information of an alternative route 1 and information of an alternative route 2 are shown in Table 1. Acquired flight operation information is shown in Table 2, wherein a unit of capacity is sorties/hour, a unit of route length is kilometers, and a unit of fuel consumption per unit time is kilograms/minute. The capacity of the downstream airspace unit of the planned route is 10 sorties/hour, and a time slot length is 6 minutes.

TABLE 1

Route information

| Route number | Available route | Route capacity | Flight level (capacity of flight level) | Route length |
|---|---|---|---|---|
| 1 | Planned route | 4 | FL1 (4) | 80 |
| 2 | Alternative route 1 | 7 | FL2 (4) and FL3 (3) | 100 |
| 3 | Alternative route 2 | 7 | FL1 (2), FL2 (3) and FL3 (2) | 120 |

TABLE 2

Flight operation information

| Flight number | Aircraft type | Expected arrival time | Flight level planned to be used | Flight level (fuel consumption per unit time of the flight at the flight level) | Level of importance | Number of passengers |
|---|---|---|---|---|---|---|
| 1 | Heavy | 14:00 | FL1 | FL1 (85.2), FL2 (83.3) and FL3 (80.7) | International | 270 |
| 2 | Medium | 14:02 | FL3 | FL1 (39.2), FL2 (37.2) and FL3 (35.6) | Domestic | 150 |
| 3 | Medium | 14:04 | FL1 | FL1 (39.2), FL2 (37.2) and FL3 (35.6) | Domestic | 140 |
| 4 | Heavy | 14:06 | FL2 | FL1 (120.1), FL2 (116.7) and FL3 (113.4) | International | 290 |
| 5 | Heavy | 14:08 | FL2 | FL1 (85.2), FL2 (83.3) and FL3 (80.7) | International | 300 |
| 6 | Medium | 14:10 | FL2 | FL1 (39.2), FL2 (37.2) and FL3 (35.6) | Domestic | 120 |
| 7 | Heavy | 14:12 | FL3 | FL1 (120.1), FL2 (116.7) and FL3 (113.4) | International | 300 |
| 8 | Medium | 14:14 | FL1 | FL1 (39.2), FL2 (37.2) and FL3 (35.6) | Domestic | 110 |
| 9 | Heavy | 14:16 | FL3 | FL1 (85.2), FL2 (83.3) and FL3 (80.7) | International | 270 |
| 10 | Medium | 14:18 | FL1 | FL1 (39.2), FL2 (37.2) and FL3 (35.6) | Domestic | 100 |
| 11 | Heavy | 14:20 | FL1 | FL1 (85.2), FL2 (83.3) and FL3 (80.7) | Domestic | 280 |
| 12 | Heavy | 14:22 | FL3 | FL1 (120.1), FL2 (116.7) and FL3 (113.4) | International | 300 |
| 13 | Medium | 14:24 | FL3 | FL1 (39.2), FL2 (37.2) and FL3 (35.6) | Domestic | 120 |
| 14 | Heavy | 14:26 | FL1 | FL1 (85.2), FL2 (83.3) and FL3 (80.7) | International | 250 |
| 15 | Medium | 14:28 | FL1 | FL1 (39.2), FL2 (37.2) and FL3 (35.6) | Domestic | 150 |
| 16 | Medium | 14:30 | FL1 | FL1 (39.2), FL2 (37.2) and FL3 (35.6) | Domestic | 110 |
| 17 | Heavy | 14:32 | FL3 | FL1 (85.2), FL2 (83.3) and FL3 (80.7) | International | 300 |
| 18 | Heavy | 14:34 | FL3 | FL1 (120.1), FL2 (116.7) and FL3 (113.4) | Domestic | 270 |
| 19 | Heavy | 14:36 | FL2 | FL1 (85.2), FL2 (83.3) and FL3 (80.7) | International | 300 |
| 20 | Medium | 14:38 | FL2 | FL1 (39.2), FL2 (37.2) and FL3 (35.6) | Domestic | 160 |
| 21 | Heavy | 14:40 | FL3 | FL1 (85.2), FL2 (83.3) and FL3 (80.7) | International | 280 |
| 22 | Medium | 14:42 | FL3 | FL1 (39.2), FL2 (37.2) and FL3 (35.6) | Domestic | 140 |
| 23 | Medium | 14:44 | FL1 | FL1 (39.2), FL2 (37.2) and FL3 (35.6) | Domestic | 150 |
| 24 | Heavy | 14:46 | FL1 | FL1 (120.1), FL2 (116.7) and FL3 (113.4) | International | 290 |
| 25 | Heavy | 14:48 | FL3 | FL1 (85.2), FL2 (83.3) and FL3 (80.7) | International | 280 |
| 26 | Heavy | 14:50 | FL2 | FL1 (85.2), FL2 (83.3) and FL3 (80.7) | Domestic | 270 |
| 27 | Medium | 14:52 | FL3 | FL1 (39.2), FL2 (37.2) and FL3 (35.6) | Domestic | 60 |
| 28 | Heavy | 14:54 | FL2 | FL1 (120.1), FL2 (116.7) and FL3 (113.4) | Domestic | 130 |
| 29 | Heavy | 14:56 | FL2 | FL1 (85.2), FL2 (83.3) and FL3 (80.7) | International | 300 |
| 30 | Heavy | 14:58 | FL2 | FL1 (120.1), FL2 (116.7) and FL3 (113.4) | International | 300 |

According to existing researches, ground delay costs of heavy and medium aircrafts are 4,167 Yuan/hour and 2,916 Yuan/hour respectively, and passenger delay costs per unit time of domestic and international flights are 50 Yuan/hour and 100 Yuan/hour respectively. According to a flight characteristic of route and a performance of aircraft, the average ground velocity of the flights is uniformly set to be 700 km/hour, which means that a velocity adjustment strategy is not considered. All available flight levels are set to be no higher than allowable ceiling heights of the flight performances of the flights.

Figure 3:
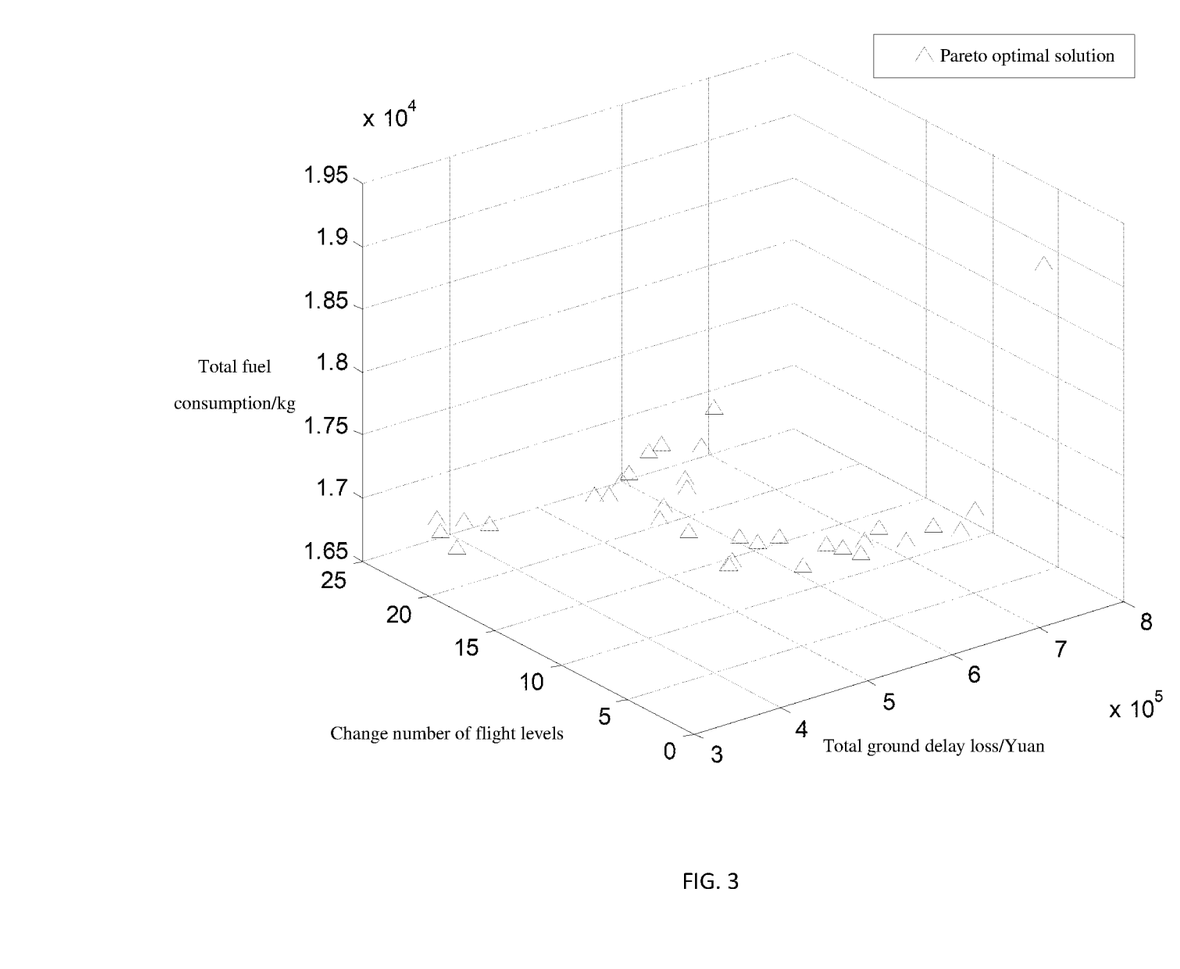
FIG. 3 is a non-inferior solution set of an embodiment.

The multi-objective optimization model for the collaborative allocation of the route time slot and the flight level is solved by Lingo, Matlab and other mathematical software to obtain the non-inferior solution set, which is namely a Pareto optimal solution set, as shown in FIG. 3, and the strategy set for the collaborative and optimal allocation of the route time slot and the flight level is formed. Each triangle in FIG. 3 denotes one Pareto optimal allocation strategy, and each allocation strategy comprises information of a route, a flight level and a time slot allocated for each flight. According to the preference of the air traffic controller, one allocation strategy is selected and issued to the information platform for collaborative management of airspace and flow.

The method for the collaborative and optimal allocation of the route time slot and the flight level of the embodiment is loaded and operated in a processing server of an air traffic flow management system (ATFM system) or a corresponding computer of an air traffic control system (ATC system).

In a specific implementation, the present application provides a computer storage medium and a corresponding data processing unit, wherein the computer storage medium is capable of storing a computer program, and the computer program, when executed by the data processing unit, can run the inventive contents of the method for the collaborative and optimal allocation of the route time slot and the flight level provided by the present invention and some or all steps in various embodiments. The storage medium may be a magnetic disk, an optical disk, a Read Only Storage (ROM) or a Random Access Storage (RAM), and the like.

Those skilled in the art can clearly understand that the technical solutions in the embodiments of the present invention can be realized by means of a computer program and a corresponding general hardware platform thereof. Based on such understanding, the essence of the technical solutions in the embodiments of the present invention or the part contributing to the prior art, may be embodied in the form of a computer program, i.e., a software product. The computer program, i.e., the software product is stored in a storage medium comprising a number of instructions such that a device (which may be a personal computer, a server, a singlechip, a MUU or a network device, and the like) comprising the data processing unit executes the methods described in various embodiments or some parts of the embodiments of the present invention.

The present invention provides the method for the collaborative and optimal allocation of the route time slot and the flight level. There are many methods and ways to realize the technical solutions. The above is only the preferred embodiments of the present invention. It should be pointed out that those of ordinary skills in the art can make some improvements and embellishments without departing from the principle of the present invention, and these improvements and embellishments should also be regarded as falling with the scope of protection of the present invention. All the unspecified components in the embodiments can be realized by the prior art.

What is claimed is:

1. A method for collaborative and optimal allocation of a route time slot and a flight level, comprising the following steps of:
step 1: acquiring planned route information and alternative route information in a traffic limited airspace, acquiring available time slot information of a downstream airspace unit of the planned route and acquiring flight operation information through an information platform for collaborative management of airspace and flow;
wherein comprises a route flight level configuration and a route length, the route flight level configuration comprises a number of flight levels configured in each route and a capacity of each flight level; and the flight operation information comprises a flight plan, a ground delay cost, an aircraft type, fuel consumptions of different flight levels and a number of passengers;
step 2: formulating an algorithm for the collaborative and optimal allocation of the route time slot and the flight level by using the information platform for collaborative management of airspace and flow;
wherein comprises:
step 2.1: establishing an objective function by taking a minimum total ground delay loss of all flights as an objective;
step 2.2: establishing an objective function by taking a minimum change number of flight levels of all flights as an objective;
step 2.3: establishing an objective function by taking a minimum total fuel consumption of all flights as an objective; and
step 2.4: establishing a constraint condition meeting effectiveness;
in the step 2.1 of taking the minimum total ground delay loss of all flights as the objective, the ground delay loss of a single flight comprises a cost of ground delay executed by the flight and a delay loss of passengers carried by the flight, and the established objective function is:

$$\min \sum_{i=1}^{I} \sum_{j=1}^{J} \sum_{k=1}^{K} \sum_{u_k=1}^{U_k} (c_i^g + c_i^p n_i)(t_j - eta_i) x_{ij}^{ku},$$

wherein $c_i^g$ denotes a unit time cost of the ground delay executed by the flight i, $1 \leq i \leq I$, and I is a total number of flights, $c_i^p$ denotes a unit time delay loss of passengers carried by the flight i, $n_i$ is a number of passengers carried by the flight i, $t_j$ is a start time of a time slot j, $1 \leq j \leq J$, J is a total number of time slots, $eta_i$ denotes a planned arrival time of the flight i to a downstream airspace unit, $1 \leq k \leq K$, K is a number of optional routes, the optional routes comprise the planned route and the alternative route, $u_k$ denotes a $u_k^{th}$ flight level of a route k, $1 \leq u_k \leq U_k$, $U_k$ is a number of flight levels of the route k, and $x_{ij}^{ku}$ is a decision variable, which is expressed as:

$$x_{ij}^{ku} = \begin{cases} 1, & \text{the flight } i \text{ is allocated to the time slot } j \text{ and} \\ & \text{the } u_k^{th} \text{ flight level of the route } k \text{ is selected} \\ 0, & \text{otherwise} \end{cases}.$$

step 3: establishing a multi-objective optimization model for the collaborative allocation of the route time slot and the flight level according to the algorithm for the collaborative and optimal allocation of the route time slot and the flight level;

step 4: solving the multi-objective optimization model established in the step 3 to obtain a non-inferior solution set, and forming a strategy set for the collaborative and optimal allocation of the route time slot and the flight level;

step 5: issuing the strategy for the collaborative and optimal allocation of the route time slot and the flight level to carry out multi-objective optimal allocation through the information platform for collaborative management of airspace and flow established in the step 1; and step 6: reallocating flights in a period of time based on the collaborative and optimal allocation of the route time slot and the flight level to carry out multi-objective optimal allocation.

2. The method for the collaborative and optimal allocation of the route time slot and the flight level according to claim 1, wherein in the step 2.2 of taking the minimum change number of flight levels of all flights as the objective, the established objective function is:

$$\min \sum_{i=1}^{I} \sum_{j=1}^{J} \sum_{k=1}^{K} \sum_{u_k=1}^{U_k} h_i^{ku} x_{ij}^{ku},$$

wherein $h_i^{ku}$ is an indicator variable for flight level change of the flight i, which is expressed as:

$$h_i^{ku} = \begin{cases} 1, & H_i^e \neq u_k \\ 0, & \text{otherwise} \end{cases},$$

wherein $H_i^e$ denotes a flight level planned to be used by the flight i.

3. The method for the collaborative and optimal allocation of the route time slot and the flight level according to claim 2, wherein in the step 2.3 of taking the minimum total fuel consumption of all flights as the objective, the established objective function is:

$$\min \sum_{i=1}^{I} \sum_{j=1}^{J} \sum_{k=1}^{K} \sum_{u_k=1}^{U_k} \frac{D_k}{v_i} f_i^{ku} x_{ij}^{ku},$$

wherein $f_i^{ku}$ denotes a fuel consumption per unit time of the flight i at the $u_k^{th}$ flight level, $D_k$ denotes a length of the route k, and $v_i$ denotes an average ground velocity of the flight i.

4. The method for the collaborative and optimal allocation of the route time slot and the flight level according to claim 3, wherein the following constraint conditions meeting effectiveness are established in the step 2.4:

$$\sum_{j=1}^{J} \sum_{k=1}^{K} \sum_{u_k=1}^{U_k} x_{ij}^{ku} = 1,$$

which denotes that each flight has only one time slot, one route and one flight level that the flight belongs to;

$$\sum_{i=1}^{I} \sum_{k=1}^{K} \sum_{u_k=1}^{U_k} x_{ij}^{ku} \leq 1,$$

which denotes that each time slot is only capable of being allocated to one flight at most;

$t_j \geq eta_i$, which denotes that an actual arrival time of the flight is incapable of being earlier than a planned arrival time;

$$t_j \geq eta_i - T_i + \frac{D_k}{v_i} x_{ij}^{ku},$$

which denotes that when the flight selects the route k, the actual arrival time is incapable of being earlier than a time after the planned arrival time is affected by a flight time of the flight in the route, wherein $T_i$ is a planned flight time of the flight i;

$x_{ij}^{ku}=0, u_k > H_i^{max}$, which denotes that the flight is incapable of exceeding a ceiling height allowed by a flight performance of the flight, wherein $H_i^{max}$ denotes a maximum flight level of the flight i;

$$\sum_{i=1}^{I} \sum_{j=1}^{J} x_{ij}^{ku} \leq Ca_k^u,$$

which denotes that a flow of each flight level of the route does not exceed a capacity of each flight level, wherein $Ca_k^u$ denotes a capacity of the $u_k^{th}$ flight level of the route k; and $$\sum_{i=1}^{I} \sum_{j=1}^{J} \sum_{u_k=1}^{U_k} x_{ij}^{ku} \leq Ca_k,$$

which denotes that a flow sum of the flight levels of the route does not exceed a capacity of the route, wherein $Ca_k$ denotes a capacity of the route k.

5. The method for the collaborative and optimal allocation of the route time slot and the flight level according to claim 4, wherein the multi-objective optimization model for the collaborative allocation of the route time slot and the flight level established in the step 3 is:

$$\min \left\{ \sum_{i=1}^{I} \sum_{j=1}^{J} \sum_{k=1}^{K} \sum_{u_k=1}^{U_k} (c_1^g + c_i^p n_i)(t_j - eta_i) x_{ij}^{ku}, \sum_{i=1}^{I} \sum_{j=1}^{J} \sum_{k=1}^{K} \sum_{u_k=1}^{U_k} h_i^{ku} x_{ij}^{ku}, \sum_{i=1}^{I} \sum_{j=1}^{J} \sum_{k=1}^{K} \sum_{u_k=1}^{U_k} \frac{D_k}{v_i} f_i^{ku} x_{ij}^{ku} \right\}$$

$$\text{s.t.}\begin{cases} \sum_{j=1}^{J}\sum_{k=1}^{K}\sum_{u_k=1}^{U_k} x_{ij}^{ku} = 1 \\ \sum_{i=1}^{I}\sum_{k=1}^{K}\sum_{u_k=1}^{U_k} x_{ij}^{ku} \leq 1 \\ t_j \geq eta_i \\ t_j \geq eta_i - T_i + \dfrac{D_k}{v_i} x_{ij}^{ku} \\ x_{ij}^{ku} = 0,\, u_k > H_i^{max} \\ \sum_{i=1}^{I}\sum_{j=1}^{J} x_{ij}^{ku} \leq Ca_k^u \\ \sum_{i=1}^{I}\sum_{j=1}^{J}\sum_{u_k=1}^{U_k} x_{ij}^{ku} \leq Ca_k \\ x_{ij}^{ku}\begin{cases}1,\text{ the flight } i \text{ is allocated to the time slot } j \text{ and the } u_k^{th} \text{ flight level of the route } k \text{ is selected}\\ 0,\text{ otherwise}\end{cases} \\ h_i^{ku} = \begin{cases} 1,\, H_i^e \neq u_k \\ 0,\text{ otherwise}\end{cases} \\ 1 \leq i \leq I,\, 1 \leq j \leq J,\, 1 \leq k \leq K,\, 1 \leq u_k \leq U_k \end{cases}$$

which carries out a route flow management and the collaborative management of airspace and flow based on a result of the step 5.

\* \* \* \* \*